(12) United States Patent
Yamamoto

(10) Patent No.: US 8,939,535 B2
(45) Date of Patent: Jan. 27, 2015

(54) DEFECTIVE PRINTER NOZZLE COMPENSATION CONTROL

(75) Inventor: Yuko Yamamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 246 days.

(21) Appl. No.: 13/229,848

(22) Filed: Sep. 12, 2011

(65) Prior Publication Data
US 2012/0075372 A1 Mar. 29, 2012

(30) Foreign Application Priority Data
Sep. 28, 2010 (JP) .................................. 2010-216960

(51) Int. Cl.
*B41J 29/38* (2006.01)
*B41J 2/21* (2006.01)
*B41J 2/155* (2006.01)
*H04N 1/60* (2006.01)

(52) U.S. Cl.
CPC ............... *B41J 2/2139* (2013.01); *B41J 2/155* (2013.01); *B41J 2/2107* (2013.01); *B41J 2/2142* (2013.01); *H04N 1/6022* (2013.01)
USPC .......................................................... 347/14

(58) Field of Classification Search
CPC .............. B41J 2/2139; B41J 2/2142
USPC ........................................ 347/43, 47, 19, 14
See application file for complete search history.

(56) References Cited

U.S. PATENT DOCUMENTS

| | | |
|---|---|---|
| 5,581,284 A | 12/1996 | Hermanson |
| 6,033,054 A | 3/2000 | Takagi |
| 2003/0085950 A1* | 5/2003 | Yashima .......................... 347/43 |
| 2004/0252148 A1 | 12/2004 | Shibata et al. |
| 2007/0030307 A1* | 2/2007 | Jeong ............................... 347/47 |
| 2007/0070111 A1* | 3/2007 | Vladislav .......................... 347/19 |
| 2009/0231375 A1 | 9/2009 | Folkins et al. |
| 2010/0177134 A1 | 7/2010 | Heo |

FOREIGN PATENT DOCUMENTS

| | | | |
|---|---|---|---|
| EP | 0983855 A2 | | 3/2000 |
| JP | 05-155038 | | 6/1993 |
| JP | 2001-096772 | | 4/2001 |
| JP | 2003/063043 | | 3/2003 |
| JP | 2003063043 | * | 3/2003 |
| JP | 2005-007613 | | 1/2005 |
| JP | 2005007613 | * | 1/2005 |
| JP | 2006-103053 | | 4/2006 |
| JP | 2006-240232 | | 9/2006 |
| JP | 2009-172927 | | 8/2009 |
| JP | 2009-220571 | | 10/2009 |
| KR | 20100083383 A | | 7/2010 |

* cited by examiner

Primary Examiner — Laura Martin
Assistant Examiner — Carlos A Martinez

(57) ABSTRACT

Ink ejection problems of black ink nozzles are compensated for by forming dots by mixing cyan, magenta, and yellow inks without reducing print quality. When a nozzle that discharges black ink becomes unable to properly eject ink, cyan, magenta, and yellow inks are ejected from respective nozzles to the discharge area on the recording medium to which the defective nozzle should eject ink. The volume of cyan, magenta, and yellow ink that is ejected is set based on the amount of black ink that should be ejected by the defective nozzle.

9 Claims, 7 Drawing Sheets

DEFECTIVE PRINTER NOZZLE COMPENSATION CONTROL

Priority is claimed under 35 U.S.C. §119 to Japanese Application No. 2010-216960 filed on Sep. 28, 2010, which is hereby incorporated by reference in its entirety.

BACKGROUND

1. Technical Field

The present invention relates to technology for compensating for defective nozzles in a printer when printing.

2. Related Art

Inkjet printers have a printhead with numerous fine nozzles, and operate by discharging ink from the necessary nozzles according to the character, image, or other marking to be printed on the recording medium.

The nozzle diameter is extremely small, ranging from approximately 30 µm to 60 µm, and because of the manufacturing precision or the operating conditions of the printer, for example, nozzles can become clogged and unable to discharge ink. When such defective nozzles are present, ink cannot be deposited at specific places on the recording medium, and content cannot be printed as desired. This phenomenon is also referred to herein as "dropped nozzles" or "dropped dots."

When dropped nozzles occur in the black ink nozzle group, which is used most frequently in both monochrome and color printing, text information and barcode information can be lost and the above problem is even worse.

Japan Patent No. 3157880 and Japan Patent No. 4083403 teach technology for producing black when defective black ink nozzles are detected and compensating for defective nozzles by discharging and mixing cyan, magenta, and yellow inks instead of the black ink that the black ink nozzles should discharge.

The amount of ink discharged from the printer nozzles is always the same in the printer described in Japan Patent No. 3157880. In other words, there is only one size of dot that can be formed by the ink ejected from each of the color nozzles. When compensating for defective nozzles with this configuration, each black dot that is normally formed using only black ink is formed using three times as much ink because of the use of cyan ink, magenta ink, and yellow ink, and the size of the dot is thus inevitably larger. While dropped dots can be avoided, the problem of not being able to print as desired cannot be avoided. In addition, when the recording medium is paper, the ink can run or bleed through where compensation is applied, and delayed drying can result in the printout becoming smeared.

Japan Patent No. 4083403 teaches a printer that can discharge different amounts from ink from the same nozzle, but is silent regarding the relationship between the amount of black ink and the amounts of other inks when compensating for deficient discharge from the black ink nozzles by forming dots by mixing cyan ink, magenta ink, and yellow ink.

SUMMARY

The present invention provides a method of forming dots by mixing cyan ink, magenta ink, and yellow ink to compensate for dropped black ink dots caused by defective nozzles without greatly reducing print quality while also minimizing the control load.

A first aspect of the invention is a control method for a print control device that controls a printing device that has a printhead having a plurality of nozzles that can individually eject black ink and plural other colors of ink onto a recording medium based on print data, and prints by compensating for a defective nozzle when any of the plural nozzles that discharges black ink is detected to be a defective nozzle that cannot eject ink normally, the control method including: a defective nozzle compensation process that ejects ink of at least one of the other plural colors to the discharge area on the recording medium to which the defective nozzle should eject ink, and sets the discharge volume of the ink of said color based on the volume of ink that should be ejected by the defective nozzle.

In a control method for a print control device according to another aspect of the invention, the other plural colors of ink include cyan ink, magenta ink, and yellow ink; and the defective nozzle compensation process ejects cyan ink, magenta ink, and yellow ink from respective nozzles to the discharge area on the recording medium to which the defective nozzle should eject ink, and sets the discharge volumes of the cyan ink, magenta ink, and yellow ink based on the volume of black ink that should be ejected by the defective nozzle.

The print control device according to this aspect of the invention controls the printing device to both maintain print quality and reduce the control load, and enables applying a more flexible defective nozzle compensation process.

A control method for a print control device according to another aspect of the invention also has a step of determining if first data causing the defective nozzle to eject black ink to the recording medium is contained in the print data; and if data causing the defective nozzle to eject black ink of a specified discharge volume to the recording medium is contained as the first data in the print data, the defective nozzle compensation process ejects a volume of cyan ink, magenta ink, and yellow ink that is less than the specified discharge volume at least once from the respective nozzle group to the discharge area on the recording medium of the defective nozzle.

The print control device according to this aspect of the invention avoids problems such as mixed inks running or bleeding through by controlling the printing device to reproduce black by mixing colors by discharging cyan, magenta, and yellow inks in a quantity less than the specified volume instead of ejecting a specific volume of black ink. Dropped dots can thus be avoided and print quality can be maintained. Ink consumption can also be minimized.

If data causing the defective nozzle to eject a smaller volume of black ink than the specified discharge volume to the recording medium is contained as the first data in the print data, the defective nozzle compensation process of a control method for a print control device according to another aspect of the invention ejects a volume of cyan ink, magenta ink, and yellow ink that is less than the specified discharge volume from the respective nozzles to the discharge area of the defective nozzle at least once.

When the printing device is instructed to discharge less black ink than the specified amount to the problem discharge area, the effect of dropped dots and mixing ink colors is less than when the specified amount of ink is ejected, and the print control device according to this aspect of the invention therefore reproduces black by ejecting and mixing less than the specified volume of cyan, magenta, and yellow inks. By using a uniform discharge volume to compensate, increasing the processing load can be minimized.

In a print control device control method according to another aspect of the invention, the first data is cancelled when the first data is contained in the print data.

With this aspect of the invention, the print control device can control the printing device to avoid problems caused by driving the piezoelectric device corresponding to the nozzle that cannot eject ink normally to perform a normal discharge operation.

Note that "cancel" as used herein includes meaning to delete, ignore, or change data. As a result, the data can be handled in anyway that can prevent black ink from being discharged from a defective nozzle.

In a control method for a print control device according to another aspect of the invention, the first data is cancelled when data causing the nozzles to eject cyan ink, magenta ink, and yellow ink to the discharge area is contained in the print data.

The print control device according to this aspect of the invention determines that a dropped black ink dot was compensated for by discharging a specific amount of ink, and can minimize increasing the processor load without changing the data related to the specific ink discharge. In addition, this aspect of the invention can avoid problems caused by the printing device driving the piezoelectric device corresponding to the nozzle that cannot eject ink normally to perform a normal ink ejection operation.

In a control method for a print control device according to another aspect of the invention, the first data is cancelled when data causing the nozzles to eject a smaller volume of cyan ink, magenta ink, and yellow ink than the specified discharge volume to the discharge area is contained in the print data.

The print control device according to this aspect of the invention can reproduce black by mixing colors, but can both avoid dropped dots and maintain print quality by determining that dropped dots of black ink cannot be sufficiently compensated for because the size of the formed dot is small, and changing the print data to eject cyan ink, magenta ink, and yellow ink from the nozzles in a volume less than the specified volume to the problem discharge area. In addition, this aspect of the invention can avoid problems caused by the printing device driving the piezoelectric device corresponding to the nozzle that cannot eject ink normally to perform a normal ink ejection operation.

Another aspect of the invention is a control method for a printing device that has a printhead having a plurality of nozzles that can individually eject black ink and plural other colors of ink onto a recording medium based on print data, and prints by compensating for a defective nozzle when any of the plural nozzles that discharges black ink is detected to be a defective nozzle that cannot eject ink normally, the control method including a defective nozzle compensation process that ejects ink of at least one of the other plural colors to the discharge area on the recording medium to which the defective nozzle should eject ink, and sets the discharge volume of the ink of said color based on the volume of ink that should be ejected by the defective nozzle.

In a control method for a printing device according to another aspect of the invention, the other plural colors of ink include cyan ink, magenta ink, and yellow ink; and the defective nozzle compensation process ejects cyan ink, magenta ink, and yellow ink from respective nozzles to the discharge area on the recording medium to which the defective nozzle should eject ink, and sets the discharge volumes of the cyan ink, magenta ink, and yellow ink based on the volume of ink that should be ejected by the defective nozzle.

The printing device according to this aspect of the invention controls the printing device to both maintain print quality and reduce the control load, and enables applying a more flexible defective nozzle compensation process.

Another aspect of the invention is a printing device including: a printhead having a plurality of nozzles that can eject black ink and a plurality of other colors of ink; and a control unit that selectively causes the plural nozzles to eject black ink and the other plural colors of ink to a recording medium based on print data; wherein when the control unit detects that any of the plural nozzles that discharges black ink is a defective nozzle that cannot eject ink normally, the control unit ejects ink of at least one of the other plural colors to the discharge area on the recording medium to which the defective nozzle should eject ink, and sets the discharge volume of the ink of said color based on the volume of ink that should be ejected by the defective nozzle.

When the control unit detects that any of the plural nozzles that discharges black ink is a defective nozzle that cannot eject ink normally in a printing device according to another aspect of the invention, the control unit ejects cyan ink, magenta ink, and yellow ink from respective nozzles to the discharge area on the recording medium to which the defective nozzle should eject ink, and sets the discharge volumes of the cyan ink, magenta ink, and yellow ink based on the volume of black ink that should be ejected by the defective nozzle.

Other objects and attainments together with a fuller understanding of the invention will become apparent and appreciated by referring to the following description and claims taken in conjunction with the accompanying drawings.

DESCRIPTION OF EMBODIMENTS

An inkjet printer (printer 10 below) is described below as an example of a printing device according to a preferred embodiment of the present invention.

Figure 1:
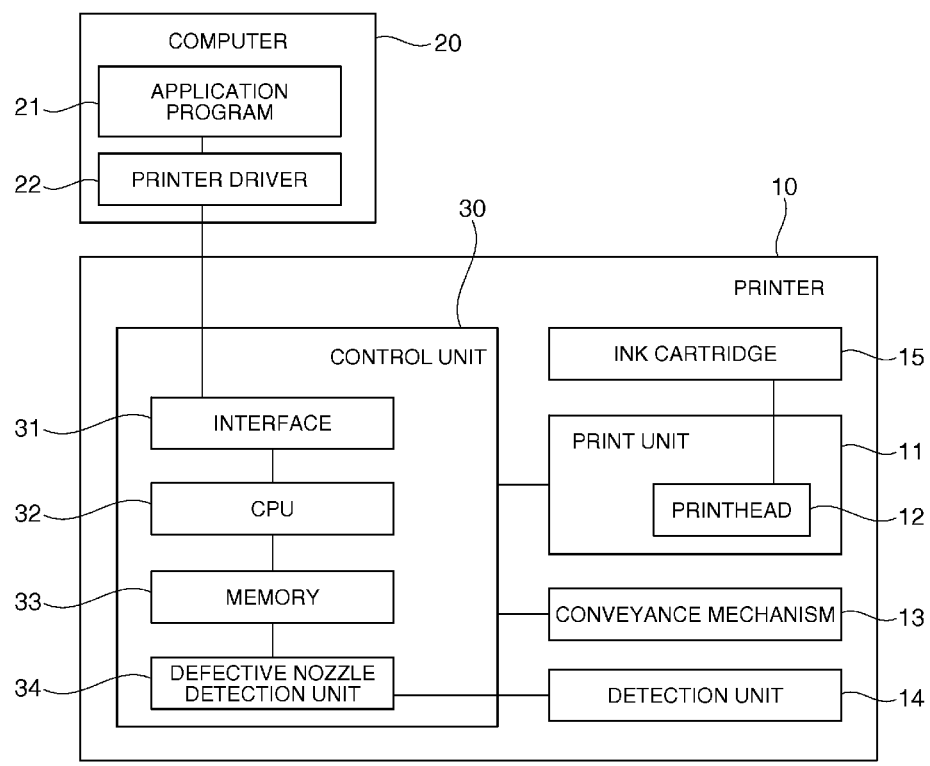
FIG. 1 is a block diagram of a printer according to a preferred embodiment of the invention.
Figure 2:
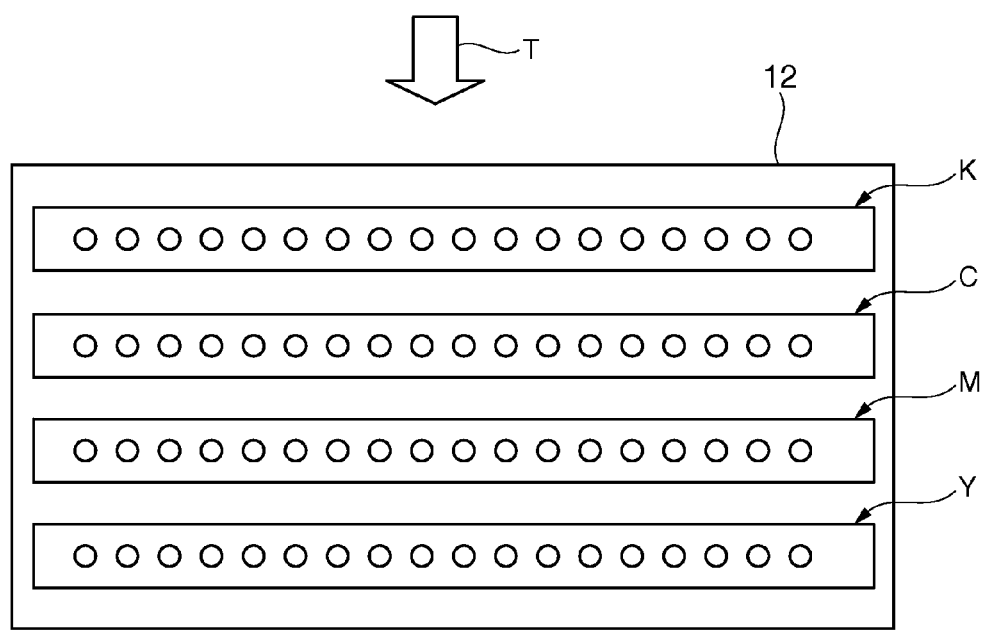
FIG. 2 shows the nozzle surface of the printhead in the printer shown in FIG. 1.

The basic configuration of the printer 10 is shown in FIG. 1. The printer 10 forms (prints) images on a recording medium such as paper, cloth, the label side of a disc-shaped recording medium, film, or other medium by discharging ink onto the recording medium. By using the four ink colors black, cyan, magenta, and yellow, full-color images can be formed (printed) on the recording medium. The printer 10 includes a print unit 11, conveyance mechanism 13, detection unit 14, control unit 30, and ink cartridge 15.

The print unit 11 includes a printhead 12 having a nozzle surface in which numerous nozzles are formed, and a platen not shown. The printhead 12 discharges ink supplied from an ink cartridge 15 from plural nozzles onto the recording medium supported on the platen.

In this embodiment of the invention the printer 10 is a line printer, and the line printhead 12 extends perpendicularly to the conveyance direction of the recording medium across the entire width of the recording medium. The plural nozzles are arrayed across the width of the printhead 12 in nozzle rows. A line printer 10 enables reducing the printer size and improving the print speed because there is no need for a mechanism to move the printhead perpendicularly to the recording medium conveyance direction as there in a common serial printer.

Because the printer 10 in this embodiment of the invention uses black (K), cyan (C), magenta (M), and yellow (Y) inks, a nozzle row is provided for each ink color across the length of the printhead 12 extending perpendicularly to the recording medium conveyance direction indicated by arrow T. These nozzle rows K, C, M, Y are disposed in order one after the other in the recording medium conveyance direction. The nozzle rows for each color can be disposed together in a single printhead 12, or each can be rendered in a separate printhead 12.

The nozzle groups of plural nozzles include a nozzle group K for discharging black ink, a nozzle group C for discharging cyan ink, a nozzle group M for discharging magenta ink, and a nozzle group Y for discharging yellow ink. The nozzle groups for discharging each color of ink are disposed with a specific gap (1/720 inch in this embodiment of the invention) therebetween perpendicularly to the recording medium conveyance direction, forming the nozzle rows for discharging each ink color.

Each row of ejection nozzles has the same number of nozzles. The nozzle rows are aligned so that the n-th nozzle in each nozzle row is at the same position in the recording medium conveyance direction T.

An ink chamber and piezodevice not shown are disposed to each nozzle, and ink droplets are ejected from a nozzle by causing the ink chamber to contract and expand by driving the corresponding piezodevice. The ejected ink droplet lands on the recording medium and forms a dot. By appropriately changing how the piezoelectric device is driven, the amount of ink discharged from the same nozzle can be changed, and the size of the dot formed on the recording medium can be changed accordingly. More specifically, the free surface area of the ink inside a nozzle is made to oscillate desirably by driving the piezoelectric device to form an ink droplet of a desired size. The printer 10 according to this embodiment of the invention can ejects ink droplets of three different sizes, large (large ink droplets), medium (medium ink droplets), and small (small ink droplets). The amount of ink in large ink droplets, medium ink droplets, and small ink droplets is 20 ng, 10 ng, and 4 ng, respectively.

The nozzles could also be configured to create bubbles inside the nozzle using a heating element, and eject liquid by means of the bubbles. The size of the ink droplets can be controlled in this configuration by adjusting the drive time of the heating element.

The conveyance mechanism 13 conveys the recording medium to the print unit 11, and then discharges the recording medium after passing the print unit 11 from the printer 10.

The control unit 30 controls the print unit 11 and the conveyance mechanism 13 by means of a CPU 32 that runs a program stored in memory 33. The control unit 30 can communicate with a computer (print control device) 20 through an interface 31, and when print data is received from the computer 20, controls the print unit 11 and conveyance mechanism 13 and prints an image corresponding to the print data on the recording medium.

The control unit 30 also has a defective nozzle detection unit 34.

The defective nozzle detection unit 34 is connected to a detection unit 14 disposed to a position where it can be opposite the printhead 12. The detection unit 14 has a conductive member that is electrically conductive to an ink sponge, and can detect electrical signals flowing through the conductive member by means of the defective nozzle detection unit 34.

The defective nozzle detection unit 34 ejects charged ink droplets from each nozzle of the printhead 12, and detects the change in signal current that results when the charged ink droplets land on the sponge. If the signal detected for a particular nozzle is below a specific threshold value, the defective nozzle detection unit 34 determines that nozzle is not discharging properly, that is, the nozzle is defective.

Alternatively, the defective nozzle detection unit 34 could be configured to control the print unit 11 and conveyance mechanism 13 so that the printhead 12 prints a test pattern, and control a photosensor to scan the printed test pattern and detect if any nozzle is not discharging correctly.

Defective nozzle data indicating the nozzles determined to be defective is then stored in memory 33. The printer 10 according to this embodiment of the invention stores results identifying which of the black ink nozzles of the printhead 12 are not discharging properly as the defective nozzle data stored in memory 33.

The defective nozzle detection unit 34 can obviously identify nozzles that are completely unable to eject ink as defective nozzles, but can also identify nozzles that can eject ink but cannot form dots normally (as designed) as defective nozzles. The deviation from the design value that the defective nozzle detection unit 34 uses to identify defective nozzles can be set as desired with consideration for defect tolerance and desired print quality.

Figure 3:
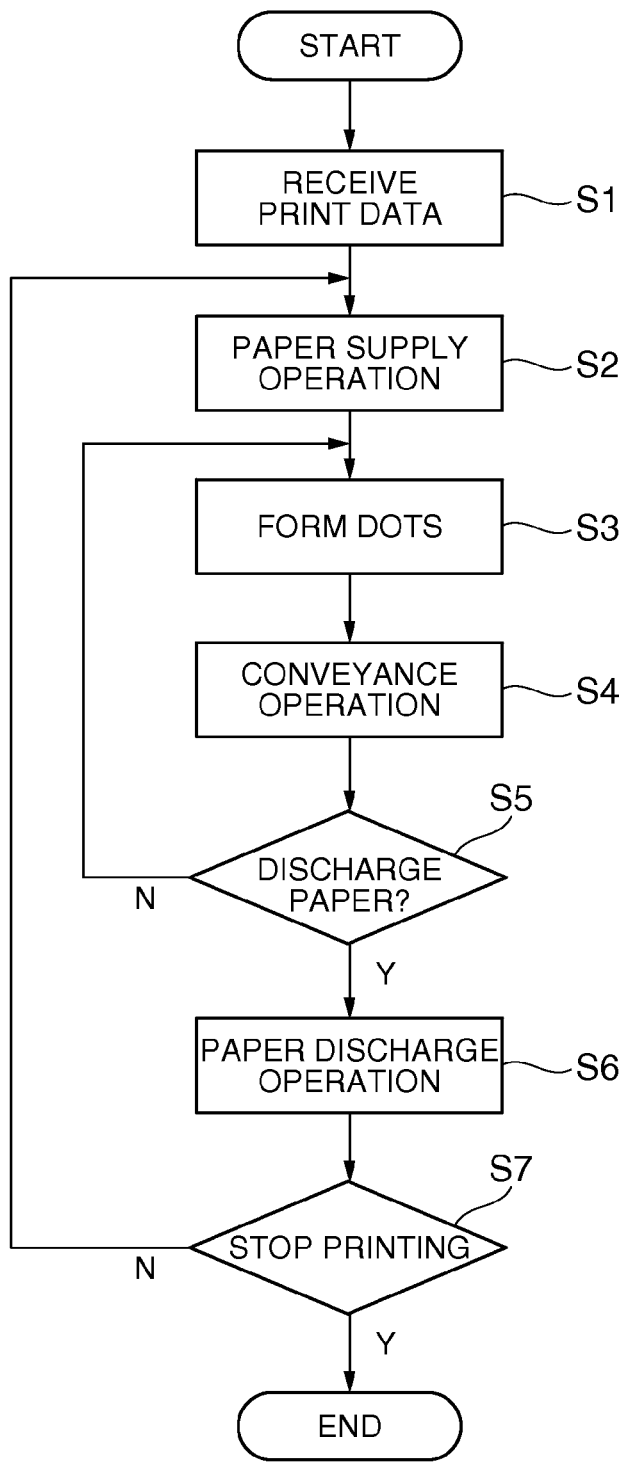
FIG. 3 is a flow chart of the printing process executed by the printer shown in FIG. 1.

The printing process executed by the printer 10 is described next with reference to the flow chart in FIG. 3.

The control unit 30 starts a printing process when print data including a print command is received from the computer 20 through the interface 31 (S1). The control unit 30 then interprets the content of the commands contained in the received print data. Next, the control unit 30 controls the conveyance mechanism 13 and positions the recording medium to the printing start position of the print unit 11. This is referred to herein as the paper supply operation (S2).

The control unit 30 then controls the printhead 12, ejects ink droplets from the nozzles, and forms dots on the recording medium. This is called the dot formation operation (S3). Dots are formed by ink droplets landing on a rectangular area (the "discharge area" below) virtually defined on the recording medium. The size and shape of the discharge area are determined according to the print resolution, and when ink droplets are ideally ejected, the ink droplets land in the center of the discharge area. The ink then spreads until a dot is formed. Because the nozzle rows for discharging different colors of ink are disposed across the entire width of the recording medium (the direction perpendicular to the recording medium conveyance direction), formation of one line of dots is completed at once by discharging a maximum of four colors of ink. "One line" as used here is equal to the amount that can be formed by a single scan of the carriage in a serial printer, that is, one raster line.

The control unit 30 then controls the conveyance mechanism 13 and moves the recording medium relative to the printhead 12. This is called the conveyance operation herein (S4). This conveyance operation enables forming the next line of dots at a different position than where the line was formed by the previous dot formation operation. Dots are formed (printed) over plural lines in the recording medium conveyance direction as a result of the control unit 30 repeating the dot formation operation and conveyance operation for as long as print data remains. After it is confirmed that no print data is left, the control unit 30 determines that the recording medium must be discharged (S5).

When the control unit 30 determines that paper discharge is required, it controls the conveyance mechanism 13 to discharge the recording medium from the printer 10. This is called the paper discharge operation (S6). When the recording medium on which an image was printed is discharged from the printer 10, the control unit 30 determines whether or not to continue printing (S7). If the control unit 30 determines to continue printing, it returns to the paper supply operation and continues the printing process. If continuation is not required, the control unit 30 ends the printing process.

The computer 20 (print control device) connected to the printer 10 is described next with reference to FIG. 1. In addition to print data, the computer 20 sends execution commands for other operations performed by the printer 10 (such as cleaning operations) to the printer 10 and controls printer 10 operation. Programs such as a printer driver 22 and application program 21 are installed on the computer 20.

The printer driver 22 receives image data from the application program 21, converts the image data to print data (produces the print data), and outputs to the printer 10. The print data includes data ("print image data" below) related to the pixels rendering the image to be printed. For example, this print image data is data (about the color and size of each dot) related to the dots to be formed in the discharge area of each pixel.

The print data generating process of the printer driver 22 is described next with reference to the flow chart in FIG. 4. Print data is produced by the printer driver 22 executing a color conversion process (S11), dot size breakdown process (S12), halftone process (S13), defective nozzle compensation process (S14), and rasterizing process (S15).

The color conversion process converts 3-color RGB (red, green, blue) image data output from the application program 21 to 4-color CMYK (cyan (C), magenta (M), and yellow (Y), black (K)) print image data pixel by pixel.

The printer driver 22 stores the correlation between combinations of RGB density values (divided into 256 gray levels for each color in this embodiment of the invention) in the original image, and combinations of CMYK density values (divided into 256 gray levels for each color in this embodiment of the invention) in the printed image, in a color conversion look-up table.

Figure 5:
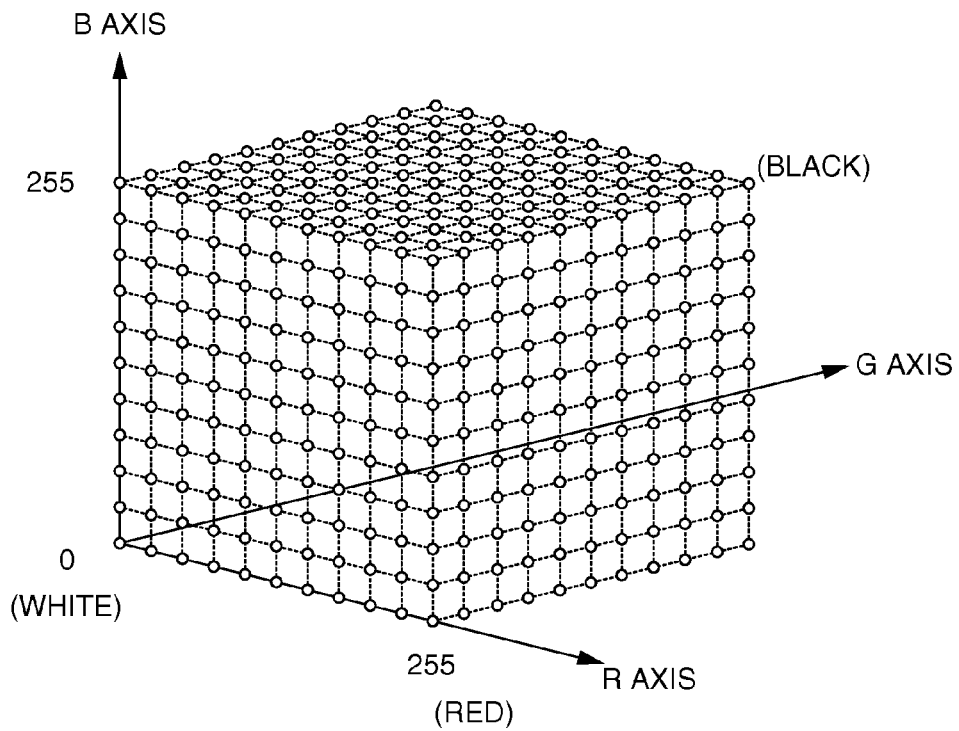
FIG. 5 describes the concept of a look-up table used in the color conversion process in FIG. 4.

FIG. 5 schematically describes the concept of this color conversion look-up table. A color space defined by the three perpendicular axes R, G, and B as shown in the figure is divided into 256 levels on each axis, producing 256×256×256 lattice points in the color space. Because every color (combination of RGB density values) in the image data corresponds to a particular lattice point in the color space, the color conversion look-up table stores the combination of CMYK density values corresponding to each lattice point. Information about the colors in the original image that was input can therefore be converted to density value (how much ink is used) information for each color of ink in the print image that is output.

In the color conversion process the printer driver 22 references the color conversion look-up table and converts the density values of the original input image to gray scale values in the print image data. Because the gray scale values correspond to the amount of ink that is used, the gray scale values of the print image data can be treated as data indicating how much of which colors of ink are used for each pixel in the printed image.

Figure 6:
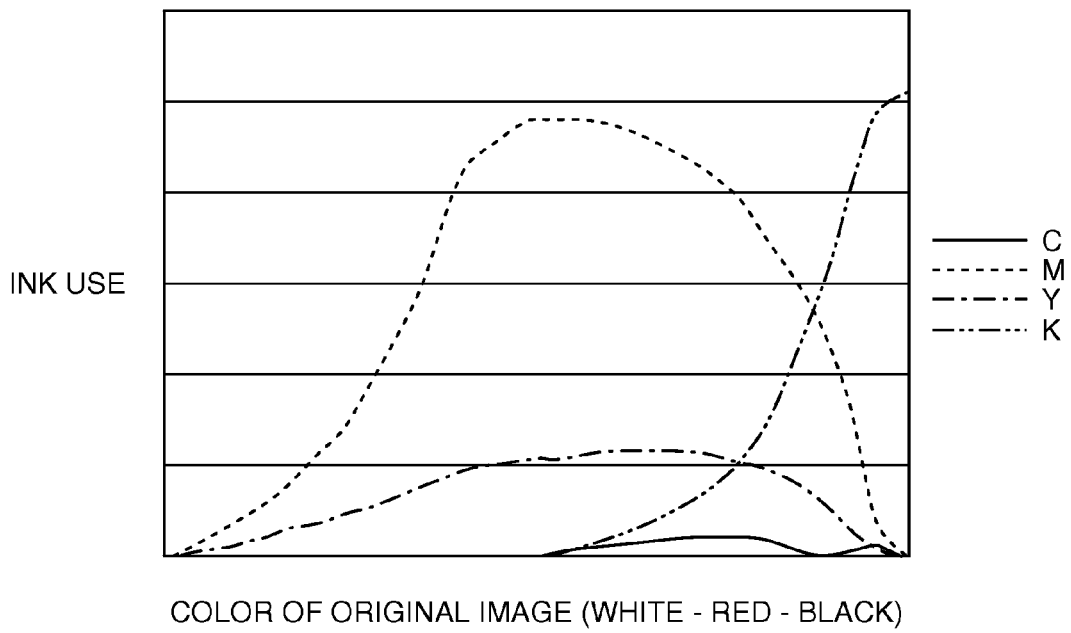
FIG. 6 is a graph of the concept of the color conversion process in FIG. 4.

FIG. 6 shows an example of this color conversion process. The change in a color in the original input image from white to red to black is shown from left to right on the x-axis. The x-axis in FIG. 6 corresponds to a path in the color space shown in FIG. 5 starting from the origin (0,0,0) to (255,0,0) on the R axis, and from there on a diagonal to coordinate (255,255,255) on the plane parallel to the GB plane through coordinate 255 on the R axis. The solid line in FIG. 6 denotes the amount of cyan ink, the dotted line denotes the amount of magenta ink, the dot-dash line denotes the amount of yellow ink, and the double-dot dash line denotes the amount of black ink. How much of which of the four colors of ink is used to reproduce a particular color in the original input image can be known from the figure. The correlation between a particular coordinate point in the color space and a particular color can be determined as desired. For example, coordinate (0,0,0) could be black, and coordinate (255,255,255) could be white.

The data obtained by this color conversion process indicates which of the 256 density values applies to each color of ink in each pixel, but because the printer 10 forms a print image by forming dots, it only knows whether or not to form a dot for each pixel. This embodiment of the invention therefore uses three different sizes of ink droplets to express states corresponding to four gray levels (no dot, small dot, medium dot, large dot), and reproduces intermediate levels by changing the density of dots formed in a specified area containing plural pixels.

Figure 7:
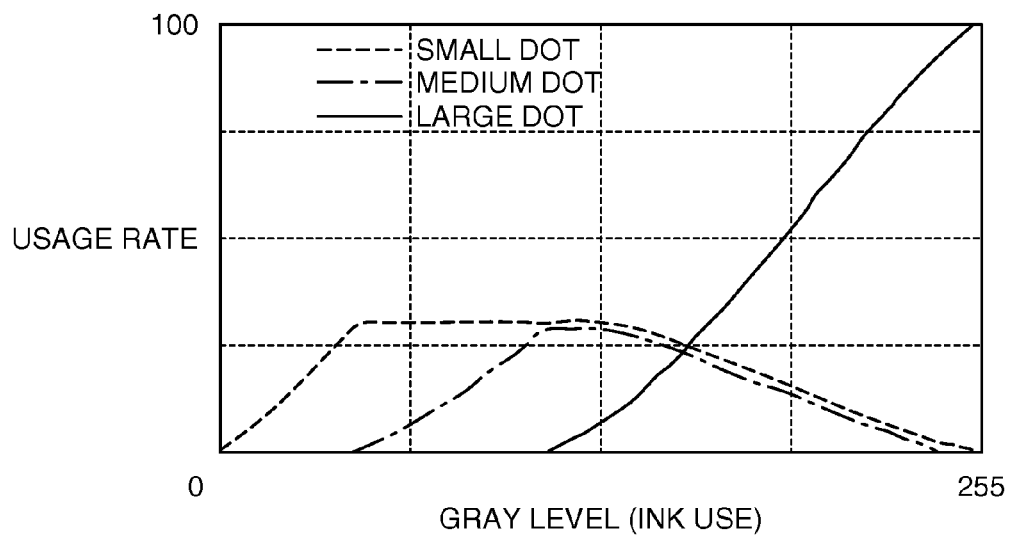
FIG. 7 shows an example of the look-up table used in the dot size breakdown process in FIG. 4.

More specifically, a dot size breakdown process is executed first (S12). The printer driver 22 stores the relationship between gradation level and the usage of large, medium, and small dots in a dot size breakdown look-up table for each color of ink. In this embodiment of the invention optical density increases and ink usage increases as the gradation level increases. The content of the dot size breakdown look-up table is therefore set so that usage of small dots is higher and usage of large dots is lower in pixels with a relatively low gray level, and as the gray level of a pixel increases, the percentage of small dots decreases and the use of medium and large dots increases. An example of such a dot size breakdown look-up table is shown in FIG. 7. The dotted line in the figure denotes the use of small dots, the dot-dash line denotes the use of medium dots, and the solid line denotes the use of large dots. Note that the correlation between gray level and optical density may be the reverse of that described here.

In the dot size breakdown process the printer driver 22 references the dot size breakdown look-up table and converts the gray level of each pixel in the print image data to usage data denoting the percentage of large dots, the percentage of medium dots, and the percentage of small dots. This conversion is performed for each color. This usage data expresses the usage rate 0 to 100 on the y-axis in FIG. 7 with a numeric value ranging from 0 to 255, that is, 256 levels.

The halftone process is then executed (S13). The halftone process is a process that determines whether or not dots are formed for each pixel so that dots are formed in the density appropriate to the gray level in the print image data. Dithering, for example, may be used for the halftone process. Dithering uses a dither matrix of threshold values with a 1:1 correlation to pixel values, and compares the data for each pixel with the threshold values. If the value of the processed image data is greater than or equal to the threshold value, a dot is formed, and if the data value is lower than the threshold value, a dot is not formed.

The usage data described above is used as the value of the processed pixel data in this embodiment of the invention. A dither matrix for large dots, medium dots, and small dots (12 values) is prepared for each of the four CMYK colors. Threshold values uniformly selected from the range 0 to 255 are arrayed according to a specific rule in each dither matrix.

Figure 8:
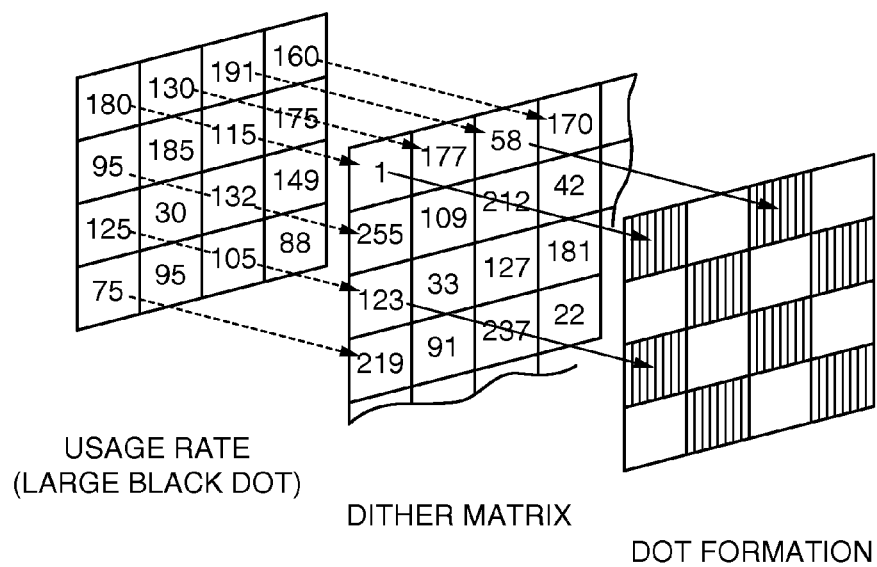
FIG. 8 describes the concept of the halftone process in FIG. 4.

A process of determining whether or not dots are formed for each pixel while referring to the dither matrix is described schematically in FIG. 8. This decision process starts by comparing the usage rate of the pixel being evaluated (the "target pixel") with the threshold value defined for the element at the position corresponding to the target pixel in the dither matrix. The arrows with dotted lines in the figure schematically describe comparing the use of large dots of black ink in the target pixel with the threshold value set for the corresponding element in the dither matrix. If the usage rate in the target pixel is greater than or equal to the threshold value, a dot is formed in the discharge area corresponding to that pixel. Conversely, if dot usage in the target pixel is less than the threshold value, a dot is not formed in the discharge area corresponding to that pixel. The solid lines in the figure illustrate the result of this process.

By applying this process to every pixel using all 12 dither matrixes, data denoting what sizes of dots to form using which inks is obtained for every pixel. For example, data indicating formation of a large dot of black ink for one pixel, and a medium dot of cyan ink and a small dot of yellow ink for a different pixel, is obtained. For convenience below, this combination of ink color and dot size is referred to as "dot data." Using standard CMYK notation, black is denoted K, cyan is C, magenta is M, and yellow is Y.

In this example, the same dot data is therefore denoted large K dot data, medium C dot data, and small Y dot data. Dot data for cyan, magenta, and yellow combined is referred to as CMY dot data, and if all CMY dots are medium dots or small dots, the dot data is referred to as medium CMY dot data or small CMY dot data.

Large dot data, medium dot data, and small dot data for black ink is collectively referred to using the color only as K dot data.

When referring, for example, to medium dot data of each color, only the size is used and referred to as medium dot data.

When referring to the dot data in general, simply "dot data" is used.

A defective nozzle compensation process is then executed (S14) as a printing control method according to the invention. This process is described next with reference to the flow chart in FIG. 9.

The printer driver 22 first requests the printer 10 to return defective nozzle data. When this request is received through the interface 31, the control unit 30 of the printer 10 sends the defective nozzle data stored in memory 33 through the interface 31 to the computer 20, and the printer driver 22 receives the data (S21).

The printer driver 22 then compares the dot data obtained from the halftone process with the defective nozzle data (S22), and determines if K dot data is assigned to a pixel formed by a black ink nozzle that was determined to be defective (S23). In other words, the printer driver 22 determines if the print data requires discharging ink from a nozzle that cannot discharge black ink for some reason. More specifically, the printer driver determines if data (first data) causing a defective nozzle to eject black ink onto the recording medium is contained in the print data. If the result is NO, the compensation process is unnecessary and this process ends.

If the result is YES, formation of the desired image is not possible and compensating for insufficient black ink (that is, a dropped dot) is necessary. More specifically, the loss of black is compensated for by combining cyan, magenta, and yellow inks to produce black. If a black ink droplet of a particular size is compensated for using cyan, magenta, and yellow ink droplets of the same size, the dot will be formed by three times as much ink and a dropped dot can be avoided, but the problem of not producing the desired printout cannot be avoided. In addition, if the recording medium is paper, ink runs or bleed-through can occur where compensation is applied, and delayed drying can result in smearing.

This embodiment of the invention therefore focuses on the size of the dots that are formed in the discharge area corresponding to the black ink nozzle determined to be defective (that is, the size of the black dots rendering the pixel corresponding to the defective nozzle), and executes a compensation process that changes the content of the printing process accordingly.

More specifically, this embodiment of the invention determines whether the dot data assigned to the problem pixel is large K dot data or medium K dot data (S24). If the result is NO, that is, the dot data assigned to the problem pixel is small K dot data, the assigned K dot data is deleted or changed to data denoting a non-printing state (S29), and the process ends. This results in a dropped dot, but if the dot to be formed for that pixel is a small dot, the effect is relatively small. This embodiment of the invention minimizes the control load on the printer driver 22 by skipping the compensation process using mixed inks in this situation.

If step S24 returns YES, whether or not C, M, and Y dot data (CMY dot data) is assigned to the problem pixel. More specifically, whether or not ink ejection is already specified for a nozzle that must discharge cyan, magenta, and yellow inks to compensate for a dropped dot of black ink is determined (S25). YES is returned only if CMY dot data is assigned.

If S25 returns NO, that is, ejecting cyan, magenta, and yellow ink for the problem pixel is not specified, or ejecting any one or two of the cyan, magenta, and yellow inks is specified, a process that assigns medium CMY dot data causing medium ink droplets of cyan, magenta, and yellow ink to be ejected is performed (S26). Because the large K dot data and medium K dot data is unnecessary, the data is deleted or changed to data denoting a non-printing state (S29), and this process ends.

The effect of a dropped dot is greatest when the problem pixel contains a large black dot. However, by reproducing black by discharging and mixing medium ink droplets of cyan, magenta, and yellow ink instead of a large black ink droplet, the above-described problems of ink runs and bleed-through can be avoided. As a result, both dropped dots can be avoided and print quality can be maintained. Ink consumption can also be minimized.

Because the effect of dropped dots and the effect of mixed ink colors are less when the problem pixel contains medium dots of black ink than when a large black dot is formed, medium ink droplets of cyan, magenta, and yellow ink are discharged instead of medium ink droplets of black ink to reproduce black by mixing colors. The increase in the processor load can also be minimized by uniformly discharging medium ink droplets as the ink droplets discharged for nozzle compensation.

When the result of step S25 is YES, that is, when the problem pixel contains cyan, magenta, and yellow dots of any size, large, medium, or small (all dots being the same size), whether or not small CMY dot data is assigned is determined (S27).

If step S27 returns YES, it is determined that black can be reproduced by mixing colors, but because the dot size is small, dropped dots of black ink cannot be sufficiently compensated for. A process that replaces small CMY dot data with medium CMY dot data is therefore performed (S28). The K dot data is then deleted or converted to non-printing data (S29), and the process ends. As described above, medium ink droplets are used because avoiding dropped dots can be balanced with maintaining print quality.

If S27 returns NO, that is, if large CMY dot data or medium CMY dot data is assigned, black is reproduced by mixing colors of sufficiently large dots, and it is determined that dropped dots of black ink are compensated for by the specified ink discharge. The K dot data is then deleted or converted to non-printing data without changing the CMY dot data (S29), and the process ends. The increase in the processor load can therefore be minimized.

The rasterizing process (S15) is then performed. The rasterizing process is a process that rearranges the dot data output from the halftone process and defective nozzle compensation process in the print data in the order in which it should be sent to the printer 10. The resulting print data is sent from the computer 20 through the interface 31 to the control unit 30 of the printer 10. The control unit 30 then controls the print unit 11 and conveyance mechanism 13 to print an image corresponding to the print data on the recording medium.

A method of compensating for discharge problems of a liquid ejection nozzle according to this embodiment of the invention is described above, but the foregoing embodiment simply facilitates understanding the invention and the invention is not limited thereto. The invention can be changed and improved in many ways without departing from the scope of the accompanying claims, and such equivalents are included in the scope of the invention.

Figure 9:
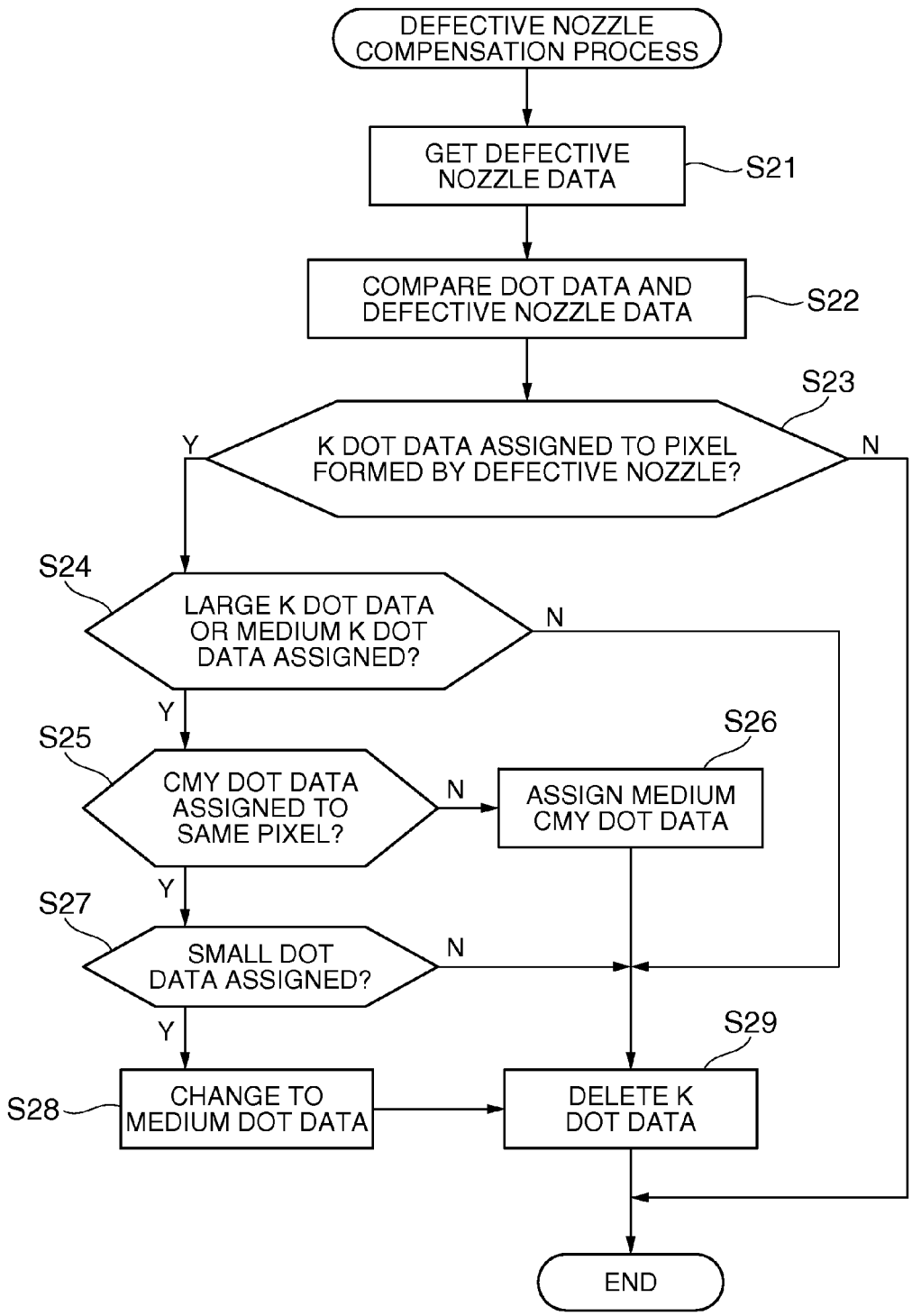
FIG. 9 is a flow chart of the defective nozzle compensation process executed by the printer driver in FIG. 1.

For example, the printer driver 22 installed in the computer 20 connected to the printer 10 runs the defective nozzle compensation process shown in FIG. 9 in the embodiment described above. However, a configuration in which firmware installed in the control unit 30 of the printer 10 executes the defective nozzle compensation process is also conceivable. In either case, however, the computer 20 in which the printer driver 22 is installed, and the printer 10 connected to the computer 20, function as a printing device.

Figure 4:
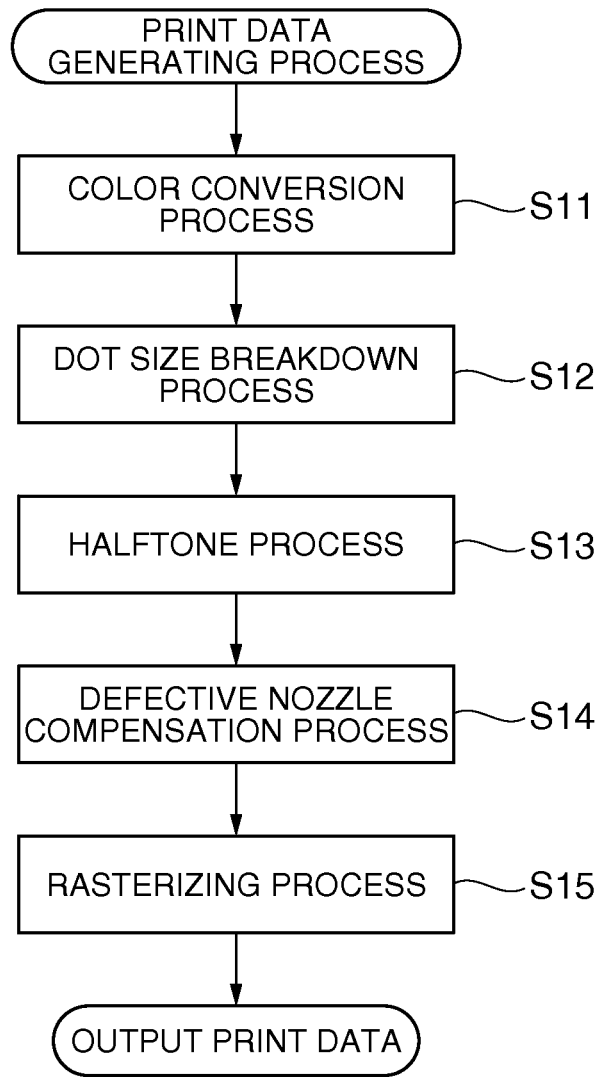
FIG. 4 is a flow chart of the print data generating process executed by the printer driver shown in FIG. 1.

In this case, the printer driver 22 executes the rasterizing process immediately after the halftone process shown in FIG. 4, and sends the resulting dot data through the interface 31 to the control unit 30 of the printer 10. The control unit 30 of the printer 10 includes a decision unit that determines whether to perform the defective nozzle compensation process, and a compensation unit that executes the defective nozzle compensation process. The firmware of the printer 10 applies the defective nozzle compensation process shown in FIG. 9 to the dot data, and the control unit 30 that generates the print data controls the print unit 11 and conveyance mechanism 13 to form an image corresponding to the print data on the recording medium.

A configuration in which all processes executed by the printer driver 22 in the embodiment described above are executed by firmware installed in the control unit 30 of the printer 10 is also conceivable. In this case, a memory card or other storage medium is inserted to a slot rendered as an interface 31 to the printer 10, for example, and image data is acquired directly from this recording medium. If the printer 10 is a hybrid device including a scanner or other image reading means, image data can be acquired directly by the image reading means. The invention can be applied to so-called "direct print" applications by using firmware to apply the processes shown in FIG. 4 and FIG. 9 to the acquired image data. In this case, the printer 10 alone functions as the printing device.

The foregoing embodiment describes a so-called line printer in which a long printhead 12 is disposed across the full width of the recording medium in the direction perpendicular to the recording medium conveyance direction, but the invention is not so limited. The invention can also be applied to so-called serial printers.

The nozzle rows of a printhead used in a serial printer have a plurality of nozzles arrayed with a specific interval therebetween in the recording medium conveyance direction. The printhead is mounted on a moving body called a carriage, and prints one line with a height equal to the length of the nozzle row while moving perpendicularly to the conveyance direction of the recording medium. When printing one line ends, the recording medium is advanced an amount equal to the height of one line, and the next line is printed while the printhead moves in the scanning direction.

An inkjet printer capable of full-color printing has a printhead with the same configuration described above for each of the four colors of ink (black, yellow, magenta, and cyan) arranged sequentially in the scanning direction. Each color of ink is discharged from the nozzles of the printhead while the carriage travels in the scanning direction. The printheads for each color can be rendered individually or in unison as a single cartridge, for example.

The foregoing embodiment describes a configuration capable of ejecting ink droplets of three different sizes, large, medium, and small, but the invention is not so limited. This naming of large, medium, and small is also for convenience as a way of expressing the relative sizes of the ink droplets, and the invention is not limited so thereto. The invention can also be applied to configurations that can eject ink droplets of four or more sizes (volumes) insofar as the relative sizes of the ink droplets supplied for the changes made in the defective nozzle compensation process described above are maintained. For example, in a configuration that can discharge ink droplets that are smaller in size than the small ink droplets described above, or ink droplets of a size between the large ink droplets and medium ink droplets, these discharge volumes can also be used to compensate for defective nozzles if the relationship between the sizes of the ink droplets is maintained.

Replacing one large black ink droplet with one medium droplet each of cyan, magenta, and yellow ink, for example, is described above, but the invention is not so limited. For example, a configuration that assures an eject ion volume equivalent to a medium ink droplet by ejecting plural smaller ink droplets of at least one of the colors cyan, magenta, and yellow is also conceivable.

The foregoing embodiment describes a printer 10 that forms images by ejecting ink as an example of a printing device according to the invention, but the invention is not so limited. For example, the method of the invention can also be applied to industrial machinery such as textile printing equipment for applying patterns to cloth.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a printing device that has a printhead having a plurality of nozzles configured to eject black ink and a plurality of nozzles configured to eject other colors of ink onto a recording medium based on print data, and that prints by compensating for any of the plurality of nozzles for ejecting black ink that is detected to be a defective nozzle that cannot eject ink normally, the control method comprising:

performing a defective nozzle compensation process when it is detected that the print data contains data for one of the plurality of nozzles that is to eject black ink to a discharge area is a defective black ink nozzle, the defective nozzle compensation process comprising:

determining a size of black dot data assigned to the discharge area that is to be formed by the defective black ink nozzle, and determining whether dot data of at least one of the other colors is assigned to the discharge area, if it is determined that large or medium dot data is assigned to the discharge area, selectively ejecting ink of at least one of the other colors to the discharge area to which the defective black ink nozzle should eject black ink, the volume of ink of the at least one of the other colors to be ejected to the discharge area, when ejected, being set based on results of the determining steps, and when at least one of the other colors is ejected to the discharge area, discharge data for the defective black ink nozzle is deleted.

2. The control method for a printing device described in claim 1, wherein:

the other colors of ink include cyan ink, magenta ink, and yellow ink; and the selectively ejecting step comprises setting the volumes of the cyan ink, magenta ink, and yellow ink to be ejected from respective nozzles to the discharge area based on the results of the determining steps.

3. The control method for a printing device described in claim 1, further comprising:

determining a size of the dot data of the least one of the other colors assigned to the discharge area, if it is determined that dot data of the at least one of the other colors is assigned to the discharge area.

4. The control method for a printing device described in claim 3, further comprising:

changing the size of the dot data of the least one of the other colors assigned to the discharge area to medium, if the size of the dot data of the at least one of the other colors assigned to the discharge area is determined to be small.

5. The control method for a printing device described in claim 3, wherein:

the control method is applied to a print control device of the printing device.

6. A printing device comprising:

a printhead having a plurality of nozzles configured to eject black ink and a plurality of nozzles configured to eject other colors of ink; and a control unit that selectively causes the pluralities of nozzles to black ink and other colors of ink onto a recording medium based on print data, the control unit being further configured to:

detect whether any of the plurality of nozzles that is to eject black ink to a discharge area is a defective black ink nozzle, determine a size of black dot data assigned to the discharge area that is to be formed by the defective black ink nozzle, determine whether dot data of at least one of the other colors is assigned to the discharge area, if it is determined that large or medium dot data is assigned to the discharge area, selectively eject ink of at least one of the other colors to the discharge area to which the defective black ink nozzle should eject black ink, the volume of ink of the at least one of the other colors to be ejected to the discharge area, when ejected, being set based on results of the determine operations, and delete discharge data for the defective black ink nozzle when at least one of the other colors is ejected to the discharge area.

7. The printing device described in claim 6, wherein:

the other colors of ink include cyan ink, magenta ink, and yellow ink; and the selectively eject operation comprises setting the volumes of the cyan ink, magenta ink, and yellow ink to be ejected from respective nozzles to the discharge area based on the results of the determine operations.

8. The printing device described in claim 7, wherein the control unit is further configured to:

determine a size of the dot data of the least one of the other colors assigned to the discharge area, if it is determined that dot data of the at least one of the other colors is assigned to the discharge area.

9. The printing device described in claim 8, wherein the control unit is further configured to:

change the size of the dot data of the least one of the other colors assigned to the discharge area to medium, if the size of the dot data of the at least one of the other colors assigned to the discharge area is determined to be small.

* * * * *